J. H. McGOWEN.
CULTIVATOR.
APPLICATION FILED DEC. 6, 1911.
1,062,923.
Patented May 27, 1913.
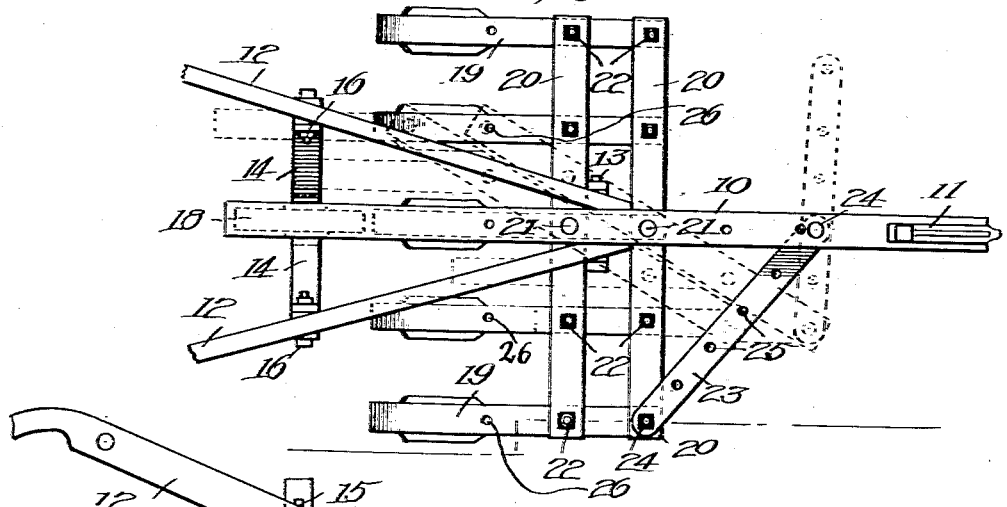
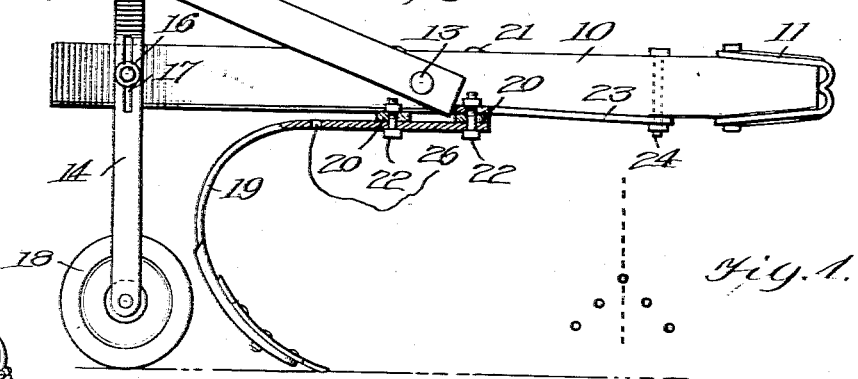
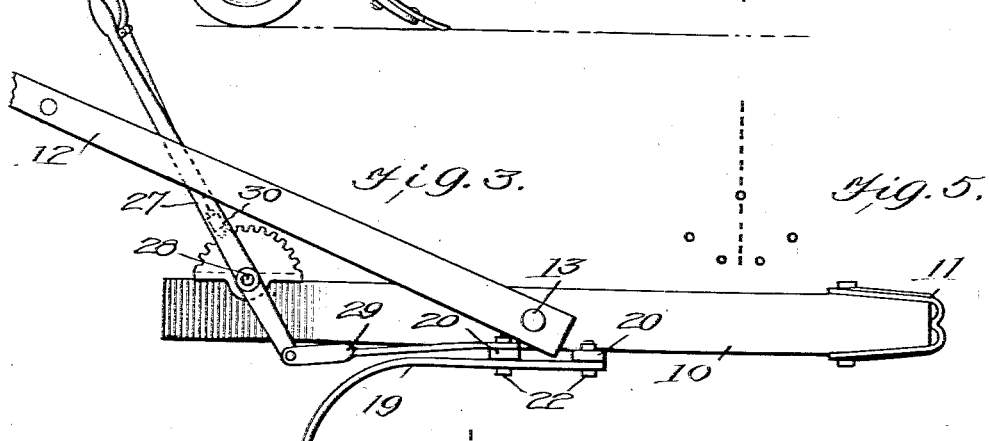
WITNESSES
INVENTOR
Joseph H. McGowen
by Milo B. Stevens &Co.
Attorneys

UNITED STATES PATENT OFFICE.

JOSEPH H. McGOWEN, OF WATHA, NORTH CAROLINA.

CULTIVATOR.

1,062,923.   Specification of Letters Patent.   Patented May 27, 1913.

Application filed December 6, 1911. Serial No. 664,308.

*To all whom it may concern:*

Be it known that I, JOSEPH H. MCGOWEN, a citizen of the United States, residing at Watha, in the county of Pender and State of North Carolina, have invented certain new and useful Improvements in Cultivators, of which the following is a specification.

This invention has for its object to provide in a cultivator a novel and improved support for the teeth or shovels, by which they may be readily adjusted in various positions, groups and angles.

With this object in view, the invention consists in a novel construction and arrangement of parts to be hereinafter described and claimed, and in order that the invention may be better understood, reference is had to the accompanying drawings in which—

Figure 1 is a plan view of the implement. Fig. 2 is a side elevation thereof. Fig. 3 is a side elevation of a slightly modified structure. Figs. 4 to 6 are diagrammatic views showing the different groupings of the shovels.

Referring specifically to the drawings, 10 denotes the cultivator beam, the front end of which carries a clevis 11 for attachment of the draft animal. To the rear end of the beam are pivotally connected handles 12, said handles being suitably spaced apart and having the beam extending between the inner ends thereof. A bolt 13 passing transversely through the beam and the handles provides the pivotal connection. By pivoting the handles as stated, it is possible to adjust them vertically to suit the height of the operator, and they are held in adjusted position by a pair of brace bars 14 straddling the rear end of the beam 10. The upper ends of the brace bars are slotted as indicated at 15 and connected to the handles by a bolt 16 passing therethrough and through the slots. The braces are connected intermediate their ends to the sides of the beam by bolts 16 passing through the beam and through slots 17 in the braces. The lower ends of the braces carry a supporting wheel 18 which is adjustable vertically to regulate the depth of the cultivation, this adjustment being effected by adjusting the braces. The slotted connections shown enable the herein described adjustments to be readily made, and the handles can be adjusted without disturbing the adjustment of the supporting wheel, by simply loosening the bolt 16.

The implement is provided with ordinary spring teeth or shovels 19, which are carried by a pair of transverse supporting bars 20 pivotally connected midway between their ends to the beam 10, to swing in a horizontal plane, by means of bolts 21. Five teeth are shown, two being located on each side of the beam, and one at the center, beneath the beam, the pivot bolts 21 passing through the shank of said center tooth. The shank of each tooth is pivotally connected to both bars 20 by bolts 22 so that said bars may swing in parallel relation. The pivotal connection between the bars 20 and the beam 10 enables the bars to be set to extend at right angles or obliquely with respect to the beam, and the teeth are held in adjusted position by a brace 23 connected at one of its ends to the beam 10 and at its other end to one end of the rear one of the bars 20. The brace is fastened by bolts 24, and has a series of bolt holes 25 in order that it may be adjusted to suit the position of the bars 20. The bars 20 are adjustable to place the teeth in position to work to the right or to the left.

The shank of each spring tooth 19 has an extra bolt hole 26, so that the teeth may be adjusted into different groups. Thus by moving the center tooth two holes forward, and the next tooth on each side thereof, one hole forward, the teeth are grouped in the shape of a triangle, as shown in Fig. 4. By letting the center tooth remain two holes forward, and moving the next tooth on each side thereof back to its original place, and moving the two outside teeth one hole forward, the teeth are grouped as shown in Fig. 5, a shape very desirable to cover guano, as the front tooth stirs up the same, and the others, by their position, making a ridge on it. By running over the ridge a week or fortnight later, the front tooth mellows up the ground, and the other teeth form a ridge, which is very desirable to plant cotton upon, or to set out strawberries.

By moving the bars one hole forward, the center tooth one hole backward, and the two outside teeth one hole forward, the teeth are grouped as shown in Fig. 6. The teeth arranged in this manner will slide each side of narrow rows, and split the middle at the same time, if a sweep is mounted on the back tooth. The teeth can also be set in various other positions, in view of which the implement can be used for cultivating many different crops.

Fig. 3 shows a modification, a hand lever 27 being provided for shifting the bars 20 to place the same at different angles to the beam 10. This hand lever is pivoted to one side of the beam, as indicated at 28 to swing in a vertical plane, and its upper end is within easy reach of the operator. The lower end of the lever is connected by a link 29 to the rear one of the bars 20. The brace 23 will not be used with this structure, as the latter serves as a brace to hold the bars in adjusted position.

By pulling the lever 27 rearward, the bars 20 are swung to extend obliquely across the beam 10 and the teeth 19 work right-handed. When the lever is pushed forward, the bars are reversed and the teeth work left-handed. The bars can also be adjusted to extend at right angles to the beam. Suitable means 30 will be provided for locking the lever. The hand lever and its connection can be removed and the brace 23 substituted.

The last described adjusting means are designed primarily to be used where the rows are narrow, so that reversing at each end of the row leaves the furrow on the same side of each, and the middle is worked at one time. Where the rows are wider, and it is desired to go over the same twice or oftener, the first-described structure is more practical as it is lighter and possesses greater rigidity.

I claim:—

1. The combination of a beam, a pair of parallel cross-bars pivoted intermediate their ends to the beam to swing in a horizontal plane, and extending from opposite sides of the beam, cultivator teeth, and pivot bolts passing through the bars and the shanks of the cultivator teeth, said shanks having a plurality of bolt holes to permit adjustment of the teeth horizontally relative to one another forward or rearward of the bars to vary the grouping of the teeth.

2. The combination of a beam, a pair of parallel cross-bars pivoted intermediate their ends to the beam to swing in a horizontal plane, and extending from opposite sides of the beam, cultivator teeth, pivot bolts passing through the bars and the shanks of the cultivator teeth, said shanks having a plurality of bolt holes to permit adjustment of the teeth horizontally relative to one another forward or rearward of the bars to vary the grouping of the teeth, and a tooth mounted beneath the beam and adjustable horizontally in the direction of the length thereof relative to the other teeth.

In testimony whereof I affix my signature in presence of two witnesses.

JOSEPH H. McGOWEN.

Witnesses:
JAMES G. BLAKE,
FRANK GARRISS.